US010455765B2

(12) United States Patent
Seiders, Jr.

(10) Patent No.: US 10,455,765 B2
(45) Date of Patent: Oct. 29, 2019

(54) METHOD AND SYSTEM FOR CONTROLLING THE HEIGHT OF AGRICULTURAL IMPLEMENT RELATIVE TO THE GROUND

(71) Applicant: CNH Industrial America, LLC, New Holland, PA (US)

(72) Inventor: Kenneth Seiders, Jr., Elizabethtown, PA (US)

(73) Assignee: CNH Industrial America LLC, New Holland, PA (US)

( * ) Notice: Subject to any disclaimer, the term of this patent is extended or adjusted under 35 U.S.C. 154(b) by 124 days.

(21) Appl. No.: 15/692,014

(22) Filed: Aug. 31, 2017

(65) Prior Publication Data
US 2019/0059223 A1 Feb. 28, 2019

(51) Int. Cl.
*A01D 41/14* (2006.01)
*A01D 41/127* (2006.01)
(Continued)

(52) U.S. Cl.
CPC .......... *A01D 41/141* (2013.01); *A01B 63/008* (2013.01); *A01D 41/127* (2013.01); *A01B 63/1112* (2013.01)

(58) Field of Classification Search
CPC ....... A01B 59/041; A01B 61/02; A01B 63/00; A01B 63/1117; A01B 63/112; A01B 63/114; A01B 63/102; A01B 63/10; A01B 63/008; A01B 63/1112; A01D 41/14; A01D 41/141; A01D 41/127; A01D 41/145; F16D 48/08; F16H 47/04; F16H 61/47; F16H 61/435

USPC ...... 37/348, 414; 56/10.2 A–10.2 G, 10.2 R, 56/17.1, 208; 60/413, 469; 172/2–11; 701/50, 82
See application file for complete search history.

(56) References Cited

U.S. PATENT DOCUMENTS 4,979,092 A 12/1990 Bergene et al.
5,577,373 A 11/1996 Panoushek et al.
(Continued)

FOREIGN PATENT DOCUMENTS

EP 3087819 A2 11/2016

OTHER PUBLICATIONS

International Search Report and Written Opinion for PCT Application No. PCT/US2018/049184 dated Nov. 15, 2018 (13 pages).

*Primary Examiner* — Robert E Pezzuto
(74) *Attorney, Agent, or Firm* — Peter K. Zacharias; Patrick M. Sheldrake

(57) ABSTRACT

In one aspect, a method for automatically controlling a height of an implement of an agricultural work vehicle relative to a ground surface may include monitoring, with one or more computing devices, the height of the implement relative to the ground surface. The method may also include determining, with the one or more computing devices, an implement height error by comparing the height of the implement with a predetermined target height. The method may also include calculating, with the one or more computing devices, a proportional signal based on the implement height error raised to a power greater than one. The method may also include adjusting, with the one or more computing devices, the height of the implement relative to the ground surface based on the proportional signal.

17 Claims, 4 Drawing Sheets

(51) Int. Cl.
*A01B 63/00* (2006.01)
*A01B 63/111* (2006.01)

(56) References Cited

U.S. PATENT DOCUMENTS

| | | | |
|---|---|---|---|
| 5,704,200 | A | 1/1998 | Chmielewski |
| 6,591,591 | B2 | 7/2003 | Coers et al. |
| 6,965,822 | B2 * | 11/2005 | Brome ................... F16D 48/08 173/2 |
| 7,168,229 | B1 * | 1/2007 | Hoffman ................ A01D 41/14 56/208 |
| 7,725,234 | B2 * | 5/2010 | Shull ................... A01B 63/1117 172/2 |
| 8,333,057 | B2 | 12/2012 | Schroeder et al. |
| 8,406,966 | B2 * | 3/2013 | Schedgick ........... A01B 63/114 172/239 |
| 8,560,182 | B2 * | 10/2013 | Ringwald .............. A01D 46/08 56/10.2 E |
| 9,148,998 | B2 | 10/2015 | Bollin et al. |
| 9,693,502 | B2 * | 7/2017 | Gofron ................. A01B 73/00 |
| 9,706,708 | B2 * | 7/2017 | Smith ................... A01D 41/14 |
| 10,015,923 | B2 * | 7/2018 | Gschwendtner ..... A01B 63/008 |
| 2008/0155954 | A1 | 7/2008 | Schlipf |

\* cited by examiner

METHOD AND SYSTEM FOR CONTROLLING THE HEIGHT OF AGRICULTURAL IMPLEMENT RELATIVE TO THE GROUND

FIELD OF THE INVENTION

The present subject matter relates generally to height control systems for agricultural implements, and, more particularly, to a method and system for a controlling the height of an agricultural implement relative to a ground surface.

BACKGROUND OF THE INVENTION

A harvester is an agricultural machine that is used to harvest and process crops. For instance, a forage harvester may be used to cut and comminute silage crops, such as grass and corn. Similarly, a combine harvester may be used to harvest grain crops, such as wheat, oats, rye, barely, corn, soybeans, and flax or linseed. In general, the objective is to complete several processes, which traditionally were distinct, in one pass of the machine over a particular part of the field. In this regard, most harvesters are equipped with a detachable harvesting implement, such as a header, which cuts and collects the crop from the field and feeds it to the base harvester for further processing.

Conventionally, the operation of most harvesters requires substantial operational involvement and control by the operator. For example, with reference to a combine, the operator is typically required to control various operating parameters, such as the direction of the combine, the speed of the combine, the height of the combine header, the air flow through the combine cleaning fan, the amount of harvested crop stored on the combine; and/or the like. To address such issues, many current combines utilizes an automatic header height and tilt control system to maintain a constant cutting height above the ground regardless of the ground contour or ground position relative to the base combine. For instance, it is known to utilize electronically controlled height and tilt cylinders to automatically adjust the height and lateral orientation, or tilt, of the header relative to the ground based on sensor measurements. However, such systems often exhibit significant lag and slow response times, particularly when the harvester is operating at high ground speeds.

Accordingly, an improved method and related system for controlling the height of an agricultural implement relative to the ground that addresses one or more of the issues identified above would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for automatically controlling a height of an implement of an agricultural work vehicle relative to a ground surface. The method may include monitoring, with one or more computing devices, the height of the implement relative to the ground surface. The method may also include determining, with the one or more computing devices, an implement height error by comparing the height of the implement with a predetermined target height. The method may also include calculating, with the one or more computing devices, a proportional signal based on the implement height error raised to a power greater than one. The method may also include adjusting, with the one or more computing devices, the height of the implement relative to the ground surface based on the proportional signal.

In another aspect, the present subject matter is directed to a height control system for an implement of an agricultural work vehicle. The control system may include an implement connected with the agricultural work vehicle, a implement height sensor configured to detect a height of the implement relative to a ground surface, and a controller communicatively coupled to the implement height sensor. The controller may include a processor and associated memory, and the memory may store instructions that, when executed by the processor, configure the implement controller to monitor the height of the implement relative to the ground surface based on signals received from the implement height sensor. The controller may also be configured to determine an implement height error by comparing the height of the implement with a predetermined target height. The controller may also be configured to calculate a proportional signal based on the implement height error raised to a power greater than one. The controller may also be configured to adjust the height of the implement based on the proportional signal.

In a further aspect, the present subject matter is directed to a method for automatically controlling a height of a header of an agricultural harvester relative to a ground surface. The method may comprise monitoring, with one or more computing devices, the height of the header relative to the ground surface, and determining, with the one or more computing devices, a header height error by comparing the height of the header with a predetermined target height. The method may also include calculating, with the one or more computing devices, a proportional signal based on the header height error raised to a power between 1.5 and 2.5. The method may also include adjusting, with the one or more computing devices, the height of the header relative to the ground surface based on the proportional signal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
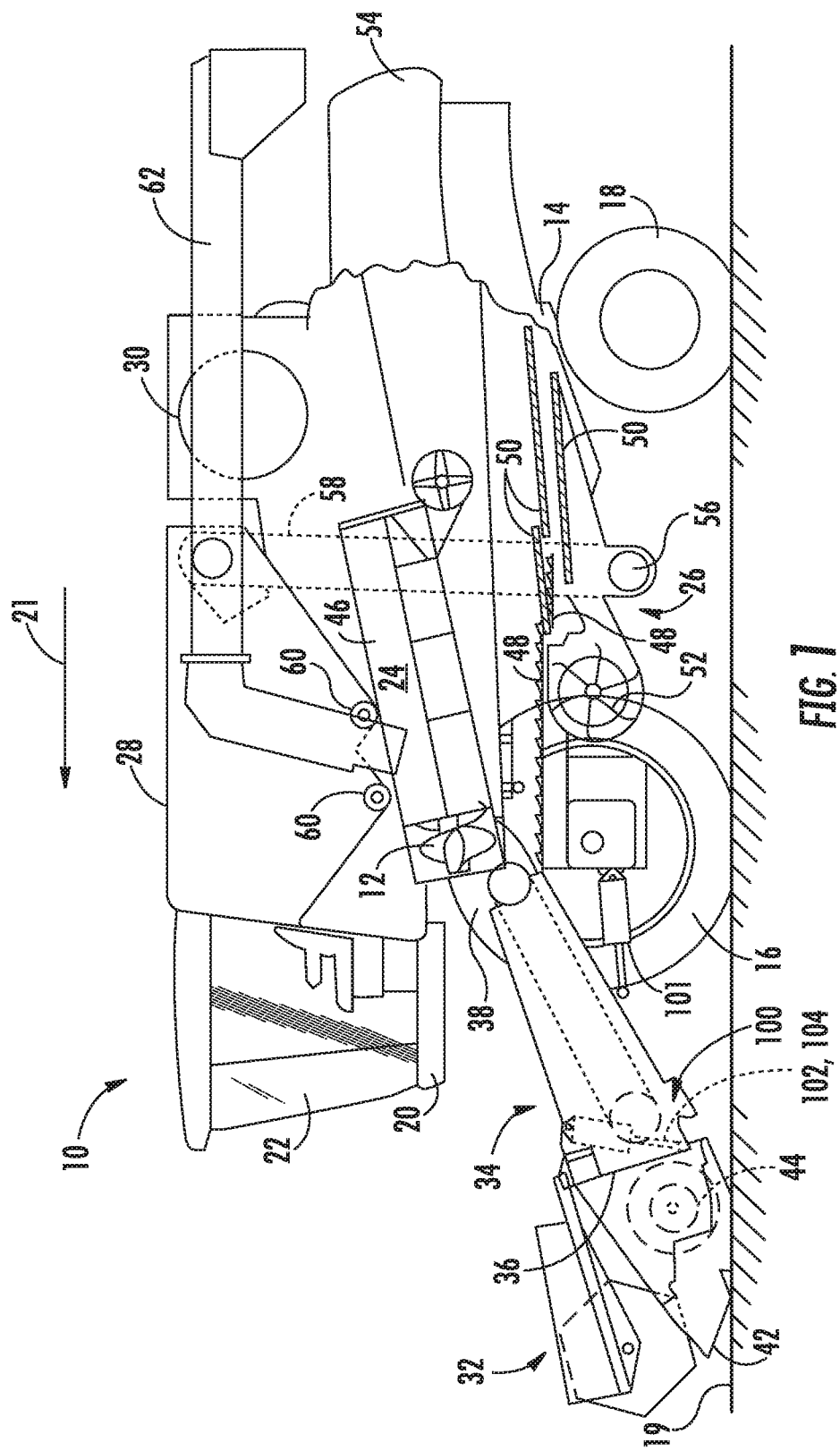
FIG. 1 illustrates a simplified, partial sectional side view of one embodiment of an agricultural vehicle in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a control system for controlling the height of an implement associated with an agricultural vehicle. For example, a proportional-integral ("PI") or proportional-integral-derivative ("PID") control system may be used to monitor and control the height of the implement relative to a ground surface. In accordance with aspects of the present subject matter, the proportional signal may include a nonlinear component to improve responsiveness when compared with a standard PI or PID controller. For example, in several embodiments, the proportional signal may be raised to a power greater than one, such as a power of two. Although the disclosed systems and methods will be described primarily with references to harvesters, they may be applicable to any suitable agricultural vehicles having implements which would benefit from improved height control.

Referring now to the drawings, FIG. 1 illustrates a simplified, partial sectional side view of one embodiment of a work vehicle, a harvester 10. The harvester 10 may be configured as an axial-flow type combine, wherein crop material is threshed and separated while it is advanced by and along a longitudinally arranged rotor 12. The harvester 10 may include a chassis or main frame 14 having a pair of driven, ground-engaging front wheels 16 and a pair of steerable rear wheels 18. The wheels 16, 18 may be configured to support the harvester 10 relative to a ground surface 19 and move the harvester 10 in a forward direction of movement 21 relative to the ground surface 19. Additionally, an operator's platform 20 with an operator's cab 22, a threshing and separating assembly 24, a grain cleaning assembly 26 and a holding tank 28 supported by the frame 14. Additionally, as is generally understood, the harvester 10 may include an engine and a transmission mounted on the frame 14. The transmission may be operably coupled to the engine and may provide variably adjusted gear ratios for transferring engine power to the wheels 16, 18 via a drive axle assembly (or via axles if multiple drive axles are employed).

Moreover, as shown in FIG. 1, a harvesting implement (e.g., a header 32) and an associated feeder 34 may extend forward of the main frame 14 and may be pivotally secured thereto for generally vertical movement. In general, the feeder 34 may be configured to serve as support structure for the header 32. As shown in FIG. 1, the feeder 34 may extend between a front end 36 coupled to the header 32 and a rear end 38 positioned adjacent to the threshing and separating assembly 24. As is generally understood, the rear end 38 of the feeder 34 may be pivotally coupled to a portion of the harvester 10 to allow the front end 36 of the feeder 34 and, thus, the header 32 to be moved upwardly and downwardly relative to the ground 19 to set the desired harvesting or cutting height for the header 32.

As the harvester 10 is propelled forwardly over a field with standing crop, the crop material is severed from the stubble by a sickle bar 42 at the front of the header 32 and delivered by a header auger 44 to the front end 36 of the feeder 34, which supplies the cut crop to the threshing and separating assembly 24. As is generally understood, the threshing and separating assembly 24 may include a cylindrical chamber 46 in which the rotor 12 is rotated to thresh and separate the crop received therein. That is, the crop is rubbed and beaten between the rotor 12 and the inner surfaces of the chamber 46, whereby the grain, seed, or the like, is loosened and separated from the straw.

Crop material which has been separated by the threshing and separating assembly 24 falls onto a series of pans 48 and associated sieves 50, with the separated crop material being spread out via oscillation of the pans 48 and/or sieves 50 and eventually falling through apertures defined in the sieves 50. Additionally, a cleaning fan 52 may be positioned adjacent to one or more of the sieves 50 to provide an air flow through the sieves 50 that removes chaff and other impurities from the crop material. For instance, the fan 52 may blow the impurities off of the crop material for discharge from the harvester 10 through the outlet of a straw hood 54 positioned at the back end of the harvester 10.

The cleaned crop material passing through the sieves 50 may then fall into a trough of an auger 56, which may be configured to transfer the crop material to an elevator 58 for delivery to the associated holding tank 28. Additionally, a pair of tank augers 60 at the bottom of the holding tank 28 may be used to urge the cleaned crop material sideways to an unloading tube 62 for discharge from the harvester 10.

Moreover, in several embodiments, the harvester 10 may also include a hydraulic system 100 which is configured to adjust a height of the header 32 relative to the ground 19 so as to maintain the desired cutting height between the header 32 and the ground 19. The hydraulic system 100 may include a height control cylinder 101 configured to adjust the height of the header 32 relative to the ground. For example, in some embodiments, the height control cylinder 101 may be coupled between the feeder 34 and the frame 14 such that the second height control cylinder 101 may pivot the feeder 34 to raise the header 32 relative to the ground 19. In some embodiments, hydraulic system 100 may include first and second tilt cylinders 102, 104 coupled between the header 32 and the feeder 34 to allow the header 32 to be tilted relative to the ground 19 or pivoted laterally or side-to-side relative to the feeder 34.

Figure 2:
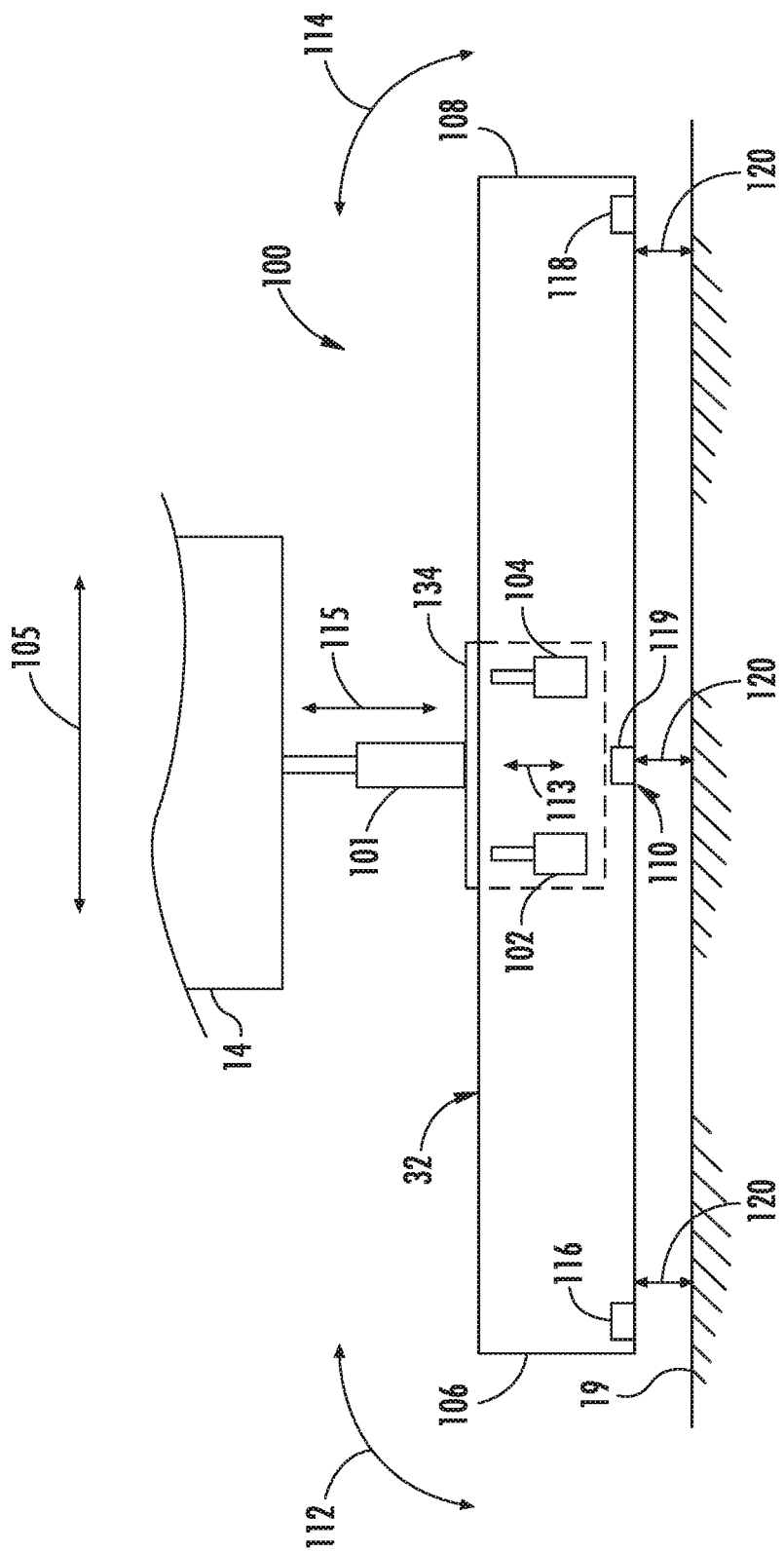
FIG. 2 illustrates a simplified, schematic view of one embodiment of a hydraulic system for an agricultural harvester in accordance with aspects of the present subject matter.

Referring now to FIG. 2, a simplified, schematic view of one embodiment of the hydraulic system 100 described above with reference to FIG. 1 is illustrated in accordance with aspects of the present subject matter. As shown, the header 32 may generally extend side-to-side or in a lengthwise direction (indicated by arrow 105 in FIG. 2) between a first lateral end 106 and a second lateral end 108. Additionally, the header 32 may be coupled to the feeder 34 at a location between its first and second lateral ends 106, 108 to allow the header 32 to tilt laterally relative to the feeder 34 (e.g., as indicated by arrows 112, 114 in FIG. 2). For example the header 32 may be coupled to the feeder 34 roughly at a center 110 of the header 32. The height control cylinder 101 may be configured to raise and lower the end of the feeder 34 relative to the frame 14 of the harvester (e.g., as indicated by arrow 115). The lateral tilt cylinders 102, 104 may be configured to laterally tilt the header 32 relative to the ground 19 (e.g., as indicated by arrows 112, 114). In some embodiments, the tilt cylinders may 102, 104 may also be configured to raise and lower the header 32 with respect to the feeder 34 (e.g., as indicated by arrow 113).

As indicated above, the hydraulic system 100 may include the height control cylinder 101 and one or more tilt cylinders 102, 104. For instance, as shown in the illustrated embodiment, the first tilt cylinder 102 may be coupled between the header 32 and the feeder 34 along one lateral side of the connection between the header 32 and the feeder 34, and a second tilt cylinder 104 may be coupled between the header 32 and the feeder 34 along the opposed lateral side of the connection between the header 32 and the feeder 34. In general, the operation of the height control cylinder 101 and tilt cylinders 102, 104 may be controlled (e.g., via an associated controller) to adjust the height and angle of the header 32 relative to the ground 19. For instance, one or more height sensors 116, 118, 119 may be provided on the header 32 to monitor one or more respective local distances or heights 120 defined between the header 32 and the ground 19. Specifically, as shown in FIG. 2, a first height sensor 116 may be provided at or adjacent to the first lateral end 106 of the header 32, and a second height sensor 118 may be provided at or adjacent to the second lateral end 108 of the header 32. In some embodiments, a third height sensor 119 may be provided at or adjacent the center 110 of the header 32. In such an embodiment, when one of the height sensors 116, 118, 119 detects that the local height 120 defined between the header 32 and the ground 19 differs from a desired height (or falls outside a desired height range), the height control cylinder 101 and/or the tilt cylinders 102, 104 may be actively controlled so as to adjust the height and/or tilt of the header 33 in a manner that maintains the header 32 at the desired height (or within the desired height range) relative to the ground 19. In some embodiments, the desired height may be an average, weighted average, or other suitable mathematical combination of the local heights 120 measured by one or more of the height sensors 116, 118, 119.

Figure 3:
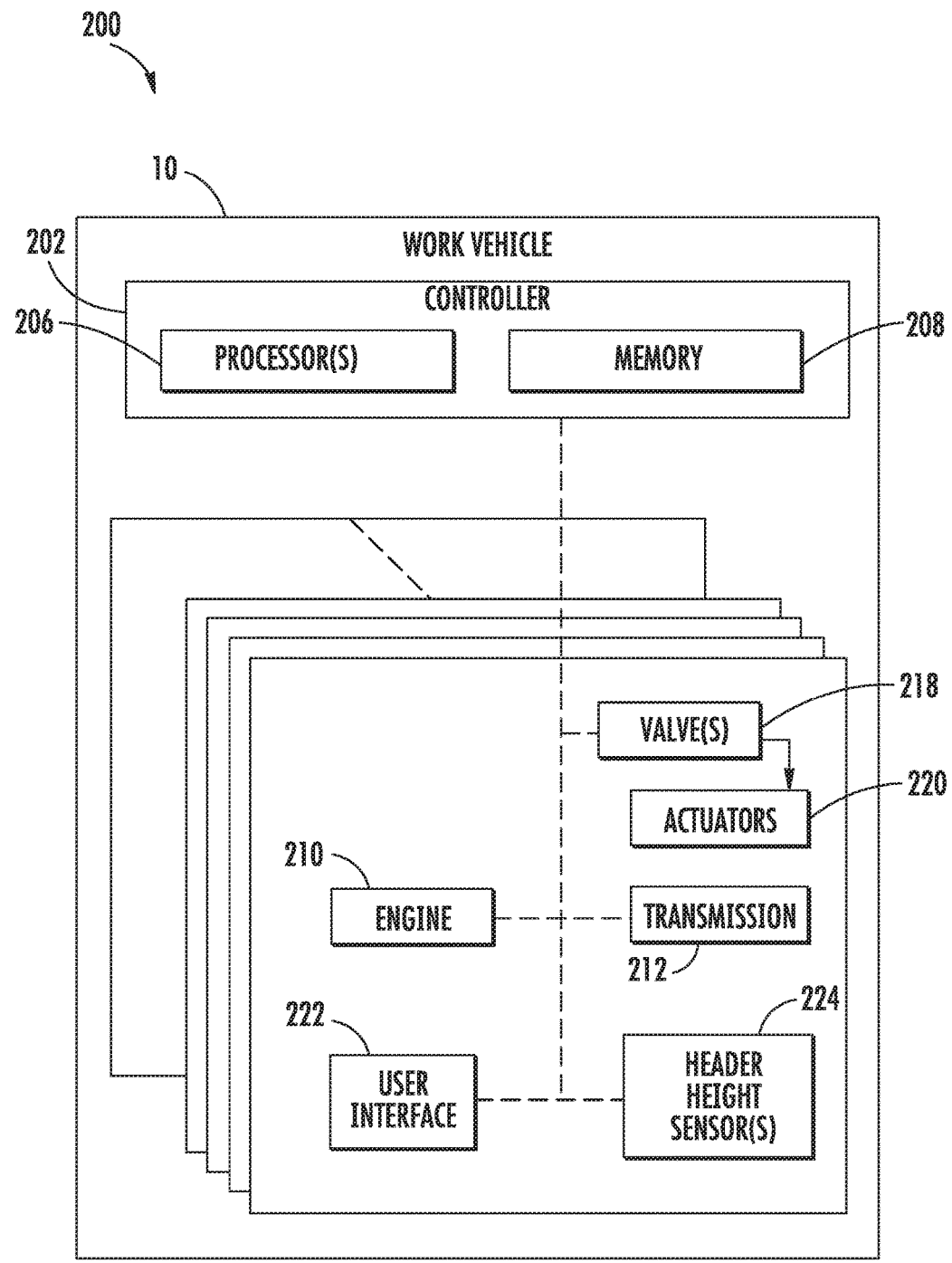
FIG. 3 illustrates a schematic view of one embodiment of a system for controlling the height of an agricultural implement relative to the ground in accordance with aspects of the present subject matter.

Referring now to FIG. 3, a schematic view of one embodiment of a control system 200 is provided for automatically controlling the height of an agricultural implement (such as the header 32 of the harvester 10 described above) relative to the ground 19 in accordance with aspects of the present subject matter. In general, the control system 200 will be described herein with reference to the harvester 10 and header 32 illustrated in FIG. 1. However, it should be appreciated that the disclosed control system 200 may be implemented to control the height of any suitable agricultural implement associated with a work vehicle having any other suitable configuration.

As shown, the control system 200 may generally include a controller 202 installed on and/or otherwise provided in operative association with the harvester 10. In general, the controller 202 of the disclosed system 200 may correspond to any suitable processor-based device(s), such as a computing device or any combination of computing devices. Thus, in several embodiments, the controller 202 may include one or more processor(s) 206 and associated memory device(s) 208 configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 208 of the controller 202 may generally comprise memory element(s) including, but not limited to, computer readable medium (e.g., random access memory (RAM)), computer readable non-volatile medium (e.g., a flash memory), a compact disc-read only memory (CD-ROM), a magneto-optical disk (MOD), a digital versatile disc (DVD) and/or other suitable memory elements. Such memory device(s) 208 may generally be configured to store suitable computer-readable instructions that, when implemented by the processor(s) 206 configure the controller 202 to perform various computer-implemented functions, such as one or more aspects of a method 300 for controlling the height of the implement described below with reference to FIG. 4.

In addition, the controller 202 may also include various other suitable components, such as a communications circuit or module, a network interface, one or more input/output channels, a data/control bus and/or the like, to allow the controller 202 to be communicatively coupled with any of the various other system components described herein. In some embodiments, the controller 202 may be configured to monitor and/or control the engine 210 and transmission 212 of the harvester 10.

Referring still to FIG. 3, the controller 202 may generally be configured to control the operation of one or more components of the harvester 10. For instance, in several embodiments, the controller 202 may be configured to control the operation of one or more components that regulate the height of the header 32 relative to the ground 19. For example, the controller 202 may be communicatively coupled to one or more control valve(s) 218 configured to regulate the supply of fluid (e.g., hydraulic fluid or air) to one or more corresponding actuator(s) 220. In some embodiments, the actuators 220 may correspond to the height control cylinder 101, first tilt cylinder 102, and/or second tilt cylinder 104, and the control valve(s) 218 may correspond to one or more valves associated with the cylinder(s) 101, 102, 104.

Moreover, as shown in the illustrated embodiment, the vehicle controller 202 may be communicatively coupled to a user interface 222 of the work vehicle 10. In general, the user interface 222 may correspond to any suitable input device(s) configured to allow the operator to provide operator inputs to the vehicle controller 202, such as a touch screen display, a keyboard, joystick, buttons, knobs, switches, and/or combinations thereof located within the cab 22 of the work vehicle 10. The operator may provide various inputs into the system 200 via the user interface 222. In one embodiment, suitable operator inputs may include, but are not limited to a target height for the implement, a crop type and/or characteristic indicative of a suitable target header height, and/or any other parameter associated with controlling the height of the implement.

Additionally, controller 202 may also be communicatively coupled to the various sensors associated the header 32. For instance, as shown in FIG. 3, the planter controller 104 may be coupled to one or more header height sensor(s) 224 configured to monitor the height of the header 32 relative to the ground 19. In one embodiment, the header height sensor(s) 224 may correspond to one or more of the one or more height sensors 116, 118, 119 configured to monitor local distance(s) or height(s) 120 defined between the header 32 and the ground 19.

Figure 4:
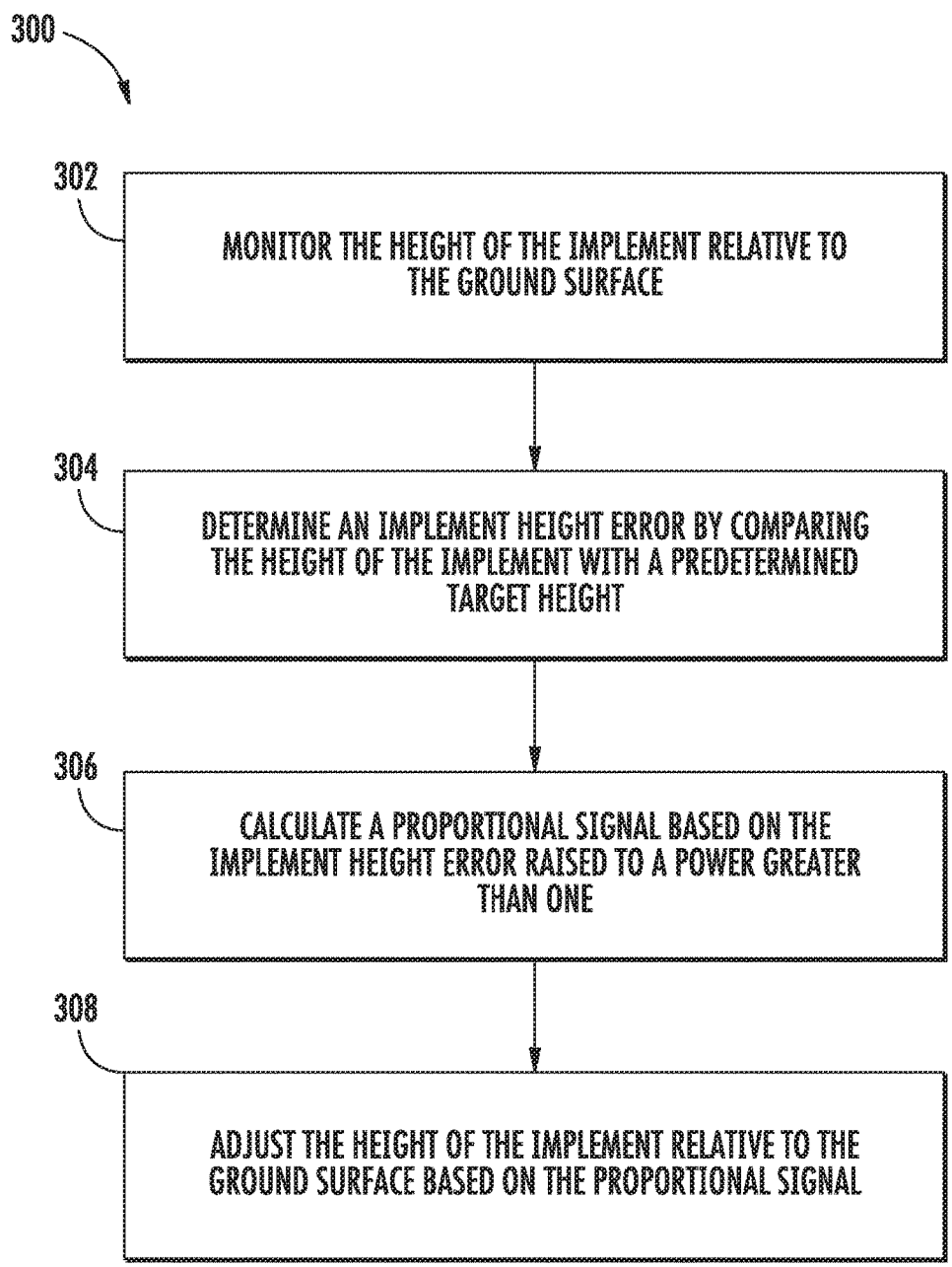
FIG. 4 illustrates a flow diagram showing one embodiment of a method for controlling the height of an agricultural implement relative to the ground in accordance with aspects of the present subject matter.

FIG. 4 illustrates a flow diagram of one embodiment of a method 300 for automatically controlling a height of an implement of an agricultural work vehicle relative to a ground surface in accordance with aspects of the present subject matter. Although FIG. 4 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure. Moreover, the method 300 may be described herein with reference to the harvester 10 and header 32 shown in FIG. 1. However, it should be appreciated that the disclosed method 300 may be implemented to control the height of any suitable agricultural implement associated with a work vehicle having any other suitable configuration.

Referring to FIG. 4, the method 300 may include, at (302), monitoring the height of the implement relative to the ground surface. For example, the controller may receive signals from the header height sensor(s) 224 (e.g., height sensors 116, 118, 119 configured to monitor local distance(s) or height(s) 120 defined between the header 32 and the ground 19). The controller 202 may be configured to receive signals from the height sensor and convert the signals into a measurement.

The method 300 may include, at (304), determining an implement height error by comparing the height of the implement with a predetermined target height. For example, the controller 202 may subtract the predetermined target height from the monitored height to determine the implement height error. Thus, when the monitored height exceeds the predetermined target height, the implement height error may be positive, and when the predetermined target height exceeds the monitored height, the implement height error may be negative.

In some embodiments, the predetermined target height may be based on the specific model of the header 32 and/or may be input by the operator through the user interface 222. For example, as indicated above, the operator may directly input a desired target height or may input crop information or characteristics, such as the type, condition, height, density, and/or the like of the crop, from which the controller may select an appropriate target height using the user interface 222.

The method 300 may include, at (306), calculating a proportional signal based on the implement height error raised to a power greater than one. For example, in one embodiment, the proportional signal may be expressed as follows, where $K_p$ represents a constant gain associated with the proportional signal, e(t) represents the implement height error as a function of time, and n is a dimensionless number, which, in some embodiments, may be greater than one:

$$u(t) = K_p e(t)^n \tag{1}$$

In other embodiments, total output signal, u(t), may have other components in addition to the proportional signal. For example, in other embodiments, additional components of the output signal, u(t), may include a derivative output signal and/or an integral output signal. For example, the controller may be configured to calculate the integral output signal based on an integral of the implement height error with respect to time. Moreover, in some embodiments, the controller may be configured to calculate a derivative output signal based on a derivative of the implement height error with respect to time.

For example, in one embodiment, the controller may be configured as a modified PI controller, and in another embodiment, the controller may be configured as a modified PID controller. The following equation shows the output signal, u(t), of a modified PID controller in accordance with aspects of the present disclosure, where e(t) represents the implement height error as a function of time, t; $K_p$, $K_i$, and $K_d$ represent respective constant gains for each of the proportional, integral, and derivative signal components; and n is a dimensional number greater than one:

$$u(t) = K_p e(t)^n + K_i \int e(t) dt + K_d \frac{de}{dt} \tag{2}$$

As shown in the above equation, the proportional signal may be based on the implement height error, u(t), raised to a power, n. In some embodiments, the power, n, may be greater than one. For example, in one embodiment, the power, n, may equal two, such that the implement height error, e(t), is squared. In other embodiments, n, may be any suitable number greater than one. For example, in some embodiments, n, may be between 1.5 and 2.5. In other embodiments, the power, n, may be between 1 and 10, for example. The power, n, may be any suitable number, however. For example, in some embodiments the power, n, may be between 0 and 1. In other embodiments the power, n, may be negative.

The power, n, may be selected or optimized such that the system 200 generally responds as desired. For example, the power, n, may be selected using empirical testing and/or theoretical modeling. In some embodiments, the controller 202 may also be configured to apply additional functions and/or operations to the proportional and/or output signal, as explained in greater detail below.

Referring again to FIG. 4, the method 300 may include, at (308), adjusting the height of the implement relative to the ground surface based on the proportional signal. For example, in some embodiments, the controller 202 may adjust one or more of the control valve(s) 218 to raise and lower the header 32 relative to the ground 19 using one or more of the actuator(s) 220, such as the height control cylinder 101 and/or the tilt cylinders 102, 104.

The non-linear proportional signal response described above may provide various benefits compared with a linear proportional signal. For example, the non-linear response may reduce the total output of the controller 202 for low implement height error values. This non-linear response may result in less movement when the implement height is close to the predetermined target height, i.e., for low implement height error values. Additionally, the non-linear response may increase the total output of the controller 202 for large implement height error values. Thus, the controller 202 may be better suited for responding to both large and small implement height errors.

For example, in some embodiments, the controller 202 may correct for large implement height errors more rapidly than a standard PI or PID controller. Similarly, the controller 202 may naturally produce a smaller, more appropriate response for small implement height errors values than a standard PI or PID controller, reducing unnecessary adjustments to the height of the implement. This may, for example, reduce unnecessary wear on the actuator(s) 220 configured to raise and lower the implement, such as the height control actuator 101 and/or the tilt control actuators 102, 104 configured to raise and lower the header 32 of the harvester 10.

In some embodiments, the method 300 may include calculating a proportional signal gain based on the implement height error. For example, the proportional signal gain, $K_p(t)$, may be a function of time. For instance, the proportional signal gain may vary with the implement height error, which may vary with time. In some embodiments, the proportional signal gain may be a product of the implement height error and a constant. For example, in the following equation, the proportional signal gain, $K_p(t)$, is a product of the absolute value of the implement height error, $e(t)$, and a constant, $K_0$:

$$K_p(t) = K_0 \cdot |e(t)| \quad (3)$$

The total output signal, $u(t)$, for one embodiment of the controller 202 in accordance with aspects of the present disclosure, may then be expressed as follows:

$$u(t) = K_0 |e(t)| e(t) + K_1 \int e(t)dt + K_p \frac{de}{dt} \quad (4)$$

The above equation is analogous to equation (2), above, where n=2 (i.e., the error is squared), except that the sign of the error signal is preserved in equation (4). Equation (4) may be more generally expressed such that it characterizes equation (2) for any value of n while also preserving the sign of the error signal using the following equation, in which m is a dimensionless number:

$$u(t) = K_0 |e(t)|^m e(t) + K_1 \int e(t)dt + K_p \frac{de}{dt} \quad (5)$$

Equation (5) is analogous to equation (2) when m=n−1.

Although explained in the context of a PI and PID controller, it should be appreciated that the present disclosure is not limited to control systems including integral or derivative signals. For example, in one embodiment, controller 202 may not utilize an integral signal or a derivative signal. In other embodiments, the controller 202 may calculate multiple proportional signals in combination with various normalization and/or saturation functions, as explained in greater detail below.

In some embodiments, various normalization and saturation functions may be applied to the various signal components and/or total output signal. In some embodiments, the controller 202 may be configured to normalize the proportional signal and/or the associated proportional signal gain. For example, the controller 202 may be configured to normalize the proportional signal gain by dividing the proportional signal gain by a predetermined height error threshold. For instance, in some embodiments, the proportional signal gain, $K_p(t)$, may be calculated according to the following equation, in which $e(t)$ represents the implement height error, $K_0$ represents a constant gain, and $e_0$ represents the predetermined height error threshold.

$$K_p(t) = \frac{K_0 \cdot |e(t)|}{e_0} \quad (6)$$

In some embodiments, the constant gain, $K_0$, may be equal to one such that an implement height error value equal to the predetermined height error threshold, $e_0$ causes the proportional signal gain, $K_p(t)$ to equal one. For such an implement height error value, the proportional signal gain neither increases nor decreases the proportional signal component of the total output. In this embodiment, the proportional signal gain, $K_p(t)$, may be greater than one when the implement height error, $e(t)$, is greater than the predetermined height error threshold, $e_0$. This may result in a faster response than a standard PT or PID controller for large implement height error values. Additionally, the proportional signal gain, $K_p(t)$, may be less than one when the implement height error, $e(t)$, is less than the predetermined height error threshold, $e_0$. This may result in a smaller, more appropriate response for small implement height error values than a standard PI or PID controller. Moreover, in some embodiments, the predetermined height error threshold, $e_0$, may be selected to optimize performance of the system 200 using empirical analysis and/or theoretical analysis.

In some embodiments, the predetermined height error threshold may be based on the predetermined target height. For example, the predetermined height error threshold may be a predetermined percentage of the predetermined target height, such a 5%, for example. In other embodiments, the predetermined height error threshold may be based on various crop characteristics, ground unevenness measurements, and/or design considerations of various joints, control valves 218, and/or actuator(s) 220 of the harvester 10. For example, the predetermined height error threshold may be based on acceptable variation in crop length, which may be based on the type of crop being harvested. In some embodiments, the predetermined height error threshold may be based on the tolerances of the connections between the feeder 34 and header 32 and/or between the feeder 34 and the frame 14 of the harvester 10. For example, the predetermined height error threshold may be selected such that the total output signal is minimized for low implement height errors to prevent unnecessary adjustments to the header height such that unnecessary wear on the actuators 220 is prevented. In some embodiments, the predetermined height error threshold may be selected to accommodate natural flex in the structure supporting the implement and/or slop between the various joints in the supporting structure. For instance, as the harvester 10 is driven over uneven ground the feeder 34 and/or header 32 may flex such that the header 32 moves up and down. Similarly, some slop may exist in the joints of the header 32 and/or the feeder 34.

In some embodiments, the controller 202 may be configured to apply a saturation function such that the proportional signal, proportional signal gain, and/or the total output signal does not exceed respective predetermined maximum gains. For example, the proportional signal gain may have a first predetermined maximum gain, and the total output signal may have a second predetermined maximum gain. This may prevent excessively fast movement of the implement. For example, this may prevent the controller 202 from causing damage and/or excessive wear to the harvester 10, header 32, feeder 34, the actuators 220, and/or the associated valves 218. Similarly, excessive signal gain could result in instability in the control system 200, such as increasing oscillations about the predetermined target height. In some embodiments, the predetermined maximum gain(s) may be empirically or theoretically determined to prevent instability. In some embodiments, the predetermined maximum gains may be based on a maximum safe speed for the implement and/or a maximum safe speed or load for the associated actuators 220. For example, in some embodiments, the predetermined maximum gain(s) may be based on a maximum speed and/or a maximum load associated with the height control cylinder 101 and/or the tilt cylinders 102, 104.

In some embodiments, the controller 202 may be configured to apply one or more discontinuous functions to at least one of the total output signal, proportional signal, or proportional signal gain. The output of such a discontinuous function may be equal to a respective predetermined constant when the implement height error is less than a respective predetermined threshold error or within a respective predetermined threshold error range. In some embodiments, this may effectively create a "dead band" within which at least one of the total output signal, proportional signal, or proportional signal gain is equal to one. Creating a dead band for the proportional signal gain, for example, may cause the controller 202 to act like a standard PI or PID controller for implement height error values within the "dead band." In such an embodiment, the controller 202 may still respond faster than a standard PI or PID when the implement height error is greater than predetermined threshold error, or outside the predetermined threshold error range, however. Similarly, creating a "dead band" for the proportional signal may reduce adjustment of the implement height when the implement height error is within the "dead band." Lastly, creating a "dead band" for total output signal may eliminate adjustment of the implement height when the implement height error is within the respective predetermined threshold error range "dead band."

In some embodiments, the controller 202 may be configured to utilize multiple proportional signal components in combination with one or more of the normalization and/or saturation functions described above. For example, in one embodiment, a first proportional signal component may have a first power, m, and first constant, $K_0$, and a second proportional signal component may have a second power, n, and a second constant, $K_1$, as shown by the following equation:

$$u(t)=K_0|e(t)|^m e(t)+K_1|e(t)|^n e(t) \qquad (7)$$

In some embodiments, a first discontinuous function and/or first saturation function may be applied to the first proportional signal component or associated proportional signal gain. Similarly, in one embodiment, a second discontinuous function and/or second saturation function may be applied to the second proportion signal component or associated proportional signal gain. These embodiments may allow for greater customization and/or adaptability of the system 200. For example, in some embodiments, the first discontinuous function may provide a first "dead band" which has a smaller range than a second "dead band."

In some embodiments, the controller may be configured to adjust the angle of the implement relative to the ground to account for ground unevenness. For example, the controller may be configured to adjust the height of the header based on the inputs from height sensor(s) 116, 118, 119. As indicated above, in some embodiments, the tilt cylinders may be capable of adjusting the height of the header 32 of the harvester 10. For example, the controller 202 may be configured to adjust the local height 120 measured at the center 110 of the header 32, using the height control cylinder 101. Additionally, in some embodiments, the controller 202 may be configured to adjust the local height 120 of the header 32 at each end 106, 108 of the header 32 using the tilt cylinders 102, 104. Moreover, in some embodiments, the controller 202 may be configured to perform discrete or linked control loops for each of the local heights 120 of the header 32 using any suitable technique or combination of techniques described herein.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for automatically controlling a height of an implement of an agricultural work vehicle relative to a ground surface, the method comprising:
    monitoring, with at least one computing device, the height of the implement relative to the ground surface;
    determining, with the at least one computing device, an implement height error by comparing the height of the implement with a predetermined target height;
    calculating, with the at least one computing device, a proportional signal gain based on the implement height error, the proportional signal gain varying with the implement height error, wherein calculating the proportional signal gain comprises at least one of:
        applying, with the at least one computing device, a discontinuous function such that the proportional signal gain is equal to a predetermined constant when the implement height error is less than a predetermined threshold error; or
        applying, with the at least one computing device, a saturation function such that the proportional signal gain does not exceed a predetermined maximum gain;
    calculating, with the at least one computing device, a proportional signal based on the implement height error raised to a power greater than one, wherein the proportional signal is based on a product of the implement height error and the proportional signal gain to raise the implement height error to the power greater than one; and
    adjusting, with the at least one computing device, the height of the implement relative to the ground surface based on the proportional signal.

2. The method of claim 1, wherein calculating the proportional signal gain includes normalizing the proportional signal gain based on the predetermined target height.

3. The method of claim 1, wherein calculating the proportional signal gain comprises applying the saturation function such that the proportional signal gain does not exceed the predetermined maximum gain.

4. The method of claim 1, wherein calculating the proportional signal gain comprises applying the discontinuous function such that the proportional signal gain is equal to the predetermined constant when the implement height error is less than the predetermined threshold error.

5. The method of claim 1, wherein calculating the proportional signal includes applying an additional discontinuous function such that the proportional signal is equal to a predetermined proportional signal constant when the implement height error is less than a predetermined proportional signal threshold error.

6. The method of claim 1, further comprising calculating an integral output signal based on an integral of the implement height error with respect to time, and wherein adjusting the height of the implement includes adjusting the height of the implement further based on the integral output signal.

7. The method of claim 1, further comprising calculating a derivative output signal based on a derivative of the implement height error with respect to time, and wherein adjusting the height of the implement includes adjusting the height of the implement further based on the derivative output signal.

8. The method of claim 1, wherein calculating the proportional signal includes squaring the implement height error.

9. The method of claim 1, wherein adjusting the height of the implement includes controlling a valve fluidly coupled with an actuator configured to raise and lower the implement.

10. A height control system for an implement of an agricultural work vehicle, the control system comprising:
an implement connected with the agricultural work vehicle;
an implement height sensor configured to detect a height of the implement relative to a ground surface;
a controller communicatively coupled to the implement height sensor, the controller including a processor and associated memory, the memory storing instructions that, when executed by the processor, configure the implement controller to:
monitor the height of the implement relative to the ground surface based on signals received from the implement height sensor;
determine an implement height error by comparing the height of the implement with a predetermined target height;
calculate a proportional signal gain based on the implement height error, the proportional signal gain varying with the implement height error, wherein calculating the proportional signal Gain comprises at least one of:
applying a discontinuous function such that the proportional signal gain is equal to a predetermined constant when the implement height error is less than a predetermined threshold error; or
applying a saturation function such that the proportional signal gain does not exceed a predetermined maximum gain;
calculate a proportional signal based on the implement height or raised to a power greater than one, wherein the proportional signal is based on a product of the implement height error and the proportional signal gain to raise the implement height error to the power greater than one; and
adjust the height of the implement based on the proportional signal.

11. The height control system of claim 10, further comprising an actuator configured to raise and lower the implement relative to the ground surface and a control valve fluidly coupled with the actuator, and wherein the controller is configured to control the flow of a fluid to the actuator using the control valve to adjust the height of the implement relative to the ground surface.

12. The height control system of claim 10, wherein the controller is configured to normalize the proportional signal gain based on the predetermined threshold error.

13. The height control system of claim 10, wherein the controller is configured to apply the saturation function such that the proportional signal gain does not exceed the predetermined maximum gain.

14. The height control system of claim 10, wherein the controller is configured to calculate an integral output signal based on an integral of the implement height error with respect to time, and wherein adjusting the height of the implement includes adjusting the height of the implement further based on the integral output signal.

15. The height control system of claim 10, wherein the controller is configured to calculate the proportional signal by squaring the implement height error.

16. The height control system of claim 10, wherein the agricultural work vehicle is a harvester, and the implement is a header.

17. A method for automatically controlling a height of a header of an agricultural harvester relative to a ground surface, the method comprising:
monitoring, with at least one computing device, the height of the header relative to the ground surface;
determining, with the at least one computing device, a header height error by comparing the height of the header with a predetermined target height;
calculating, with the at least one computing device, a proportional signal gain based on the implement height error, the proportional signal gain varying with the implement height error, wherein calculating the proportional signal gain comprises at least one of:
applying, with the at least one computing device, a discontinuous function such that the proportional signal gain is equal to a predetermined constant when the implement height error is less than a predetermined threshold error; or
applying, with the at least one computing device, a saturation function such that the proportional signal gain does not exceed a predetermined maximum gain;
calculating, with the at least one computing device, a proportional signal based on the header height error raised to a power between 1.5 and 2.5, wherein the proportional signal is based on a product of the implement height error and the proportional signal gain to raise the implement height error to the power greater than one; and
adjusting, with the at least one computing device, the height of the header relative to the ground surface based on the proportional signal.

* * * * *